US012272356B2

(12) United States Patent
Casado et al.

(10) Patent No.: US 12,272,356 B2
(45) Date of Patent: Apr. 8, 2025

(54) DYNAMIC AND/OR CONTEXT-SPECIFIC HOT WORDS TO INVOKE AUTOMATED ASSISTANT

(71) Applicant: Google LLC, Mountain View, CA (US)

(72) Inventors: Diego Melendo Casado, Mountain View, CA (US); Jaclyn Konzelmann, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/842,577

(22) Filed: Jun. 16, 2022

(65) Prior Publication Data
US 2022/0335941 A1  Oct. 20, 2022

Related U.S. Application Data

(63) Continuation of application No. 16/622,112, filed as application No. PCT/US2018/047280 on Aug. 21, 2018, now Pat. No. 11,423,890.

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/165* (2013.01); *G10L 15/02* (2013.01); *G10L 15/063* (2013.01);
(Continued)

(58) Field of Classification Search
CPC ....... G10L 15/22; G10L 15/02; G10L 15/063; G10L 15/1815; G10L 15/187;
(Continued)

(56) References Cited

U.S. PATENT DOCUMENTS 6,532,447 B1  3/2003  Christensson
6,665,639 B2  12/2003  Mozer et al.
(Continued)

FOREIGN PATENT DOCUMENTS

CN  105654943 A  6/2016
CN  105659179    6/2016
(Continued)

OTHER PUBLICATIONS

Kepuska, et al."A novel wake-up-word speech recognition system, wake-up-word recognition task, technology and evaluation." Nonlinear Analysis: Theory, Methods & Applications 71, No. 12 (2009): e2772-e2789.
(Continued)

*Primary Examiner* — Bhavesh M Mehta
*Assistant Examiner* — Darioush Agahi
(74) *Attorney, Agent, or Firm* — Gray Ice Higdon

(57) ABSTRACT

Techniques are described herein for enabling the use of "dynamic" or "context-specific" hot words for an automated assistant. In various implementations, an automated assistant may be operated at least in part on a computing device. Audio data captured by a microphone may be monitored for default hot word(s). Detection of one or more of the default hot words may trigger transition of the automated assistant from a limited hot word listening state into a speech recognition state. Transition of the computing device into a given state may be detected, and in response, the audio data captured by the microphone may be monitored for context-specific hot word(s), in addition to or instead of the default hot word(s). Detection of the context-specific hot word(s) may trigger the automated assistant to perform a responsive action associated with the given state, without requiring detection of default hot word(s).

13 Claims, 8 Drawing Sheets

(51) Int. Cl.
*G10L 15/02* (2006.01)
*G10L 15/06* (2013.01)
*G10L 15/08* (2006.01)
*G10L 15/18* (2013.01)
*G10L 15/187* (2013.01)
*G10L 15/30* (2013.01)

(52) U.S. Cl.
CPC ........ *G10L 15/1815* (2013.01); *G10L 15/187* (2013.01); *G10L 15/30* (2013.01); *G10L 2015/025* (2013.01); *G10L 2015/088* (2013.01); *G10L 2015/223* (2013.01)

(58) Field of Classification Search
CPC ............... G10L 15/30; G10L 2015/025; G10L 2015/088; G10L 2015/223; G06F 3/165
See application file for complete search history.

(56) References Cited

U.S. PATENT DOCUMENTS

| | | | |
|---|---|---|---|
| 8,719,039 B1 | 5/2014 | Sharifi | |
| 8,768,707 B2 | 7/2014 | Mozer | |
| 9,082,407 B1* | 7/2015 | Faaborg | G10L 25/48 |
| 9,263,042 B1 | 2/2016 | Sharifi | |
| 9,318,107 B1 | 4/2016 | Sharifi | |
| 9,361,885 B2 | 6/2016 | Ganong, III et al. | |
| 9,373,321 B2 | 6/2016 | Bapat et al. | |
| 9,536,528 B2 | 1/2017 | Rubin et al. | |
| 9,542,941 B1 | 1/2017 | Weksler et al. | |
| 9,548,047 B2 | 1/2017 | Clark et al. | |
| 9,691,384 B1 | 6/2017 | Wang et al. | |
| 9,721,563 B2 | 8/2017 | Naik | |
| 9,792,907 B2 | 10/2017 | Bocklet et al. | |
| 9,858,925 B2 | 1/2018 | Gruber et al. | |
| 9,886,953 B2 | 2/2018 | Lemay et al. | |
| 9,892,729 B2 | 2/2018 | Yun et al. | |
| 10,586,534 B1 | 3/2020 | Argyropoulos et al. | |
| 10,748,546 B2 | 8/2020 | Kim et al. | |
| 10,950,228 B1* | 3/2021 | Tan | G06F 3/167 |
| 11,355,098 B1* | 6/2022 | Zhong | G10L 15/22 |
| 2004/0141418 A1 | 7/2004 | Matsuo et al. | |
| 2008/0167868 A1 | 7/2008 | Kanevsky et al. | |
| 2011/0170673 A1 | 7/2011 | Dutta et al. | |
| 2012/0159536 A1* | 6/2012 | Treacy | G06Q 30/00 725/32 |
| 2014/0122059 A1 | 5/2014 | Patel et al. | |
| 2014/0274203 A1 | 9/2014 | Ganong, III et al. | |
| 2015/0053779 A1 | 2/2015 | Adamek et al. | |
| 2015/0262577 A1 | 9/2015 | Nomura | |
| 2015/0382047 A1* | 12/2015 | Van Os | H04N 21/4316 725/38 |
| 2015/0382079 A1* | 12/2015 | Lister | H04N 5/783 725/38 |
| 2016/0077794 A1 | 3/2016 | Kim et al. | |
| 2016/0267913 A1* | 9/2016 | Kim | G10L 17/24 |
| 2016/0360336 A1 | 12/2016 | Gross et al. | |
| 2017/0116986 A1 | 4/2017 | Weng et al. | |
| 2017/0193996 A1 | 7/2017 | Zurek et al. | |
| 2017/0242653 A1 | 8/2017 | Lang et al. | |
| 2018/0053507 A1 | 2/2018 | Wang et al. | |
| 2018/0108343 A1 | 4/2018 | Stevans et al. | |
| 2018/0152557 A1 | 5/2018 | White | |
| 2018/0158449 A1 | 6/2018 | Tang | |
| 2018/0173494 A1 | 6/2018 | Choi et al. | |
| 2018/0182390 A1* | 6/2018 | Hughes | G10L 15/02 |
| 2018/0260189 A1 | 9/2018 | Li | |
| 2018/0338109 A1 | 11/2018 | Badr et al. | |
| 2019/0066670 A1* | 2/2019 | White | G10L 15/28 |
| 2019/0198012 A1 | 6/2019 | Zhang et al. | |
| 2019/0206412 A1 | 7/2019 | Li et al. | |
| 2019/0212567 A1* | 7/2019 | Lin | G02B 27/0176 |
| 2019/0341031 A1 | 11/2019 | Cox et al. | |
| 2020/0047687 A1 | 2/2020 | Camhi et al. | |
| 2020/0051554 A1* | 2/2020 | Kim | G06F 3/167 |
| 2020/0057603 A1 | 2/2020 | Sarir et al. | |
| 2020/0342866 A1 | 10/2020 | Casado et al. | |
| 2020/0380973 A1* | 12/2020 | Novitchenko | G06F 40/35 |
| 2021/0098000 A1* | 4/2021 | Tanoguchi | G06Q 50/18 |
| 2021/0366477 A1* | 11/2021 | Smith | G10L 15/30 |

FOREIGN PATENT DOCUMENTS

| | | |
|---|---|---|
| CN | 106104677 A | 11/2016 |
| CN | 107085510 | 8/2017 |
| CN | 107464561 A | 12/2017 |
| CN | 107564518 | 1/2018 |
| CN | 108306797 A | 7/2018 |
| CN | 108335695 A | 7/2018 |
| EP | 3419020 | 12/2018 |
| JP | 2001249688 | 9/2001 |
| JP | 2002251235 | 9/2002 |
| JP | 2004226656 | 8/2004 |
| JP | 2016076007 | 5/2016 |
| JP | 2016526205 | 9/2016 |
| JP | 2016536648 | 11/2016 |
| JP | 2017144521 | 8/2017 |
| JP | 2017525168 | 8/2017 |
| JP | 2017537361 | 12/2017 |
| WO | 2014059416 | 4/2014 |
| WO | 2017141530 | 8/2017 |
| WO | 2018125292 | 7/2018 |
| WO | 2020040744 | 2/2020 |

OTHER PUBLICATIONS

Trollop, R. "7 Things You Didn't Know About Wake Words". [https://medium.com/@rowantrollope/7-things-you-didnt-know-about-wake-words-d4e9e041d11d [retrieved Jul. 16, 2018] 7 pages Nov. 29, 2017.
European Patent Office; Communication Pursuant to Article 94(3) EPC issue in Application Ser. No. 18773683.0; 6 pages; dated May 11, 2020.
Written Opinion and International Search Report in Application No. PCT/US2018/047280, 12 pages, dated May 20, 2019.
Intellectual Property India; Examination Report issued in Application No. 202027053420; 6 pages; dated Sep. 10, 2021.
European Patent Office; Summons to attend oral proceedings pursuant to Rule 115(1) EPC issue in Application Ser. No. 18773683.0; 8 pages; dated Sep. 24, 2021.
Japanese Patent Office; Notice of Reasons for Rejection issued in Application No. 2020-569051, 9 pages, dated Mar. 14, 2022.
European Patent Office; Brief Communication issued in Application No. 18773683.0, 44 pages, dated Sep. 22, 2022.
European Patent Office; Intention to Grant issued in Application No. 18773683.0, 49 pages, dated Oct. 20, 2022.
Japanese Patent Office; Pre-appeal Examination Report issued in App. No. 2020-569051, 6 pages, dated Nov. 28, 2022.
Japanese Patent Office; Decision of Rejection issued in App. No. 2020-569051, 6 pages, dated Jun. 20, 2022.
Korean Intellectual Property Office; Notice of Office Action issued in Application Ser. No. KR10-2020-7035755; 11 pages; dated May 30, 2022.
Intellectual Property India; Hearing Notice issued in Application No. 202027053420, 2 pages; dated Dec. 5, 2023.
China National Intellectual Property Administration; Notification of First Office Action issued in Application No. 201880094489.X; 21 pages; dated Dec. 5, 2023.
China National Intellectual Property Administration; Notification of Second Office Action issued in Application No. 201880094489.X; 13 pages; dated Apr. 27, 2024.

* cited by examiner

DYNAMIC AND/OR CONTEXT-SPECIFIC HOT WORDS TO INVOKE AUTOMATED ASSISTANT

BACKGROUND

Humans may engage in human-to-computer dialogs with interactive software applications referred to herein as "automated assistants" (also referred to as "chatbots," "virtual assistants," "interactive personal assistants," "intelligent personal assistants," "personal voice assistants," "conversational agents," etc.). For example, humans (which when they interact with automated assistants may be referred to as "users") may provide commands, queries, and/or requests using free form natural language input which may include vocal utterances converted into text and then processed and/or typed free form natural language input.

In many cases, before the automated assistant can interpret and respond to a user's request, it must first be "invoked," e.g., using predefined oral invocation phrases that are often referred to as "hot words" or "wake words." Thus, many automated assistants operate in what will be referred to herein as a "limited hot word listening state" or "default inactive state" in which they are always "listening" to audio data sampled by a microphone for a limited (or finite) set of hot words. Any utterances captured in the audio data other than the limited set of hot words are ignored. Once the automated assistant is invoked with one or more of the limited set of hot words, it may operate in what will be referred to herein as a "speech recognition state" or "general listening state" in which it performs speech-to-text ("STT") processing of audio data sampled by a microphone to generate textual input, which in turn is semantically processed to determine a user's intent (and to fulfill that intent).

Operating the automated assistant in the default inactive state in which it only listens for a limited number of hot words provides a variety of benefits. Limiting the number of hot words being "listened for" allows for conservation of power and/or computing resources. For example, an on-device machine learning model may be trained to generate output that indicates when one or more hot words are detected. Implementing such a model may require only minimal computing resources and/or power. Storing such a trained model locally on a client device also provides advantages relating to privacy. For example, most users do not want STT processing to be performed on everything they say within earshot of a computing device operating an automated assistant. Additionally, the on-device model also prevents data indicative of user utterances that are not intended to be processed by the automated assistant from being provided to a semantic processor, which often operates at least in part on the cloud.

Along with these benefits, operating the automated assistant in the limited hot word listening state also presents various challenges. To avoid inadvertent invocation of the automated assistant, hot words are typically selected to be words or phrases that are not often uttered in everyday conversation (e.g., "long tail" words or phrases). However, there are various scenarios in which requiring users to utter long tail hot words before invoking an automated assistant to perform some action can be cumbersome.

For example, users often ask automated assistants to set timers or alarms. When these timers and alarms expire and/or go off, the user must first utter some long tail hot word(s) to waken the automated assistant (i.e. transition the automated assistant into a speech recognition mode) before the user can then take action on the timer or alarm by saying something like "stop the timer." Users often request that automated assistants play media (e.g., music, videos), but once the media playback is underway, users must first awaken the automated assistant with hot word(s) before issuing commands such as "pause," "fast forward," "rewind," "skip ahead," "go to the next song," and so forth.

Some automated assistants may provide a manual option for a "continued listening" mode after a user utters a command, so that the user need not "reawaken" the automated assistant with hot word(s) before performing a subsequent command. However, manually transitioning the automated assistant into a continued listening mode means that the automated assistant may be performing far more STT processing for far more utterances, potentially wasting power and/or computing resources. Additionally, and as noted above, most users prefer that STT processing only occur once the automated assistant is explicitly invoked.

SUMMARY

Techniques are described herein for enabling the use of "dynamic" and/or "context-specific" hot words for an automated assistant. Under various circumstances, an automated assistant configured with selected aspects of the present disclosure can more intelligently listen for particular context-specific hot words that are relevant for the current circumstance (or "context"). In various implementations, the automated assistant may listen for these context-specific hot words either in addition to, or instead of, the default hot words used to invoke the automated assistant. Put another way, in various implementations, an automated assistant configured with selected aspects of the present disclosure may expand or alter, at least temporarily, its hot word vocabulary in certain circumstances.

In various implementations, dynamic hot words may be selectively enabled under a variety of different circumstances, such as transition of a computing device being used to engage with the automated assistant into a particular state. As an example, in some implementations, when a user-requested timer or alarm triggered by an automated assistant expires at a computing device, the state of the computing device may be detected. In response to detecting that state, one or more timer/alarm-context-specific hot words may be enabled, in addition to or instead of the default hot words that are always available to invoke the automated assistant. Thus, for instance, prior to the timer expiring the automated assistant may only listen for the default hot words it always listens for; once the timer expires and while an audible alarm is output, the automated assistant may listen for other hot words such as "stop the timer," "cancel the timer," etc. When these other hot words are detected, they may trigger the automated assistant to perform a responsive action, in this case stopping the timer.

As another example, automated assistants are often used to playback media, such as music or videos. While media triggered by the automated assistant (by user request) is played back, the automated assistant may listen for additional context-specific hot word(s) such as "stop," "pause," "play," "next," "last," and so forth. More generally, in various implementations, various applications triggered by the automated assistant may have various application-specific hot words associated with them. While those applications are active (e.g., operating in the foreground, not yet completed), those application-specific hot words may be listened for and acted upon when detected.

As another example, in some implementations, an assistant device used by a user to engage with an automated assistant may include a display. The automated assistant may, in addition to engaging with the user in a spoken human-to-computer dialog, display content on the display that is relevant to the human-to-computer dialog, or other content (e.g., weather, schedule, to-do list, etc.). In some implementations, this displayed content may be used to activate dynamic hot words that will be listened—for while the content continues to be displayed.

Hot words may be detected by or on behalf of automated assistants in various ways. In some implementations, a machine learning model such as a neural network, hidden Markov model, etc., may be trained to detect an ordered or unordered sequence of one or more hot words and/or phonemes in an audio data stream. In some such implementations, a separate machine learning model may be trained for each applicable hot word (or "hot phrase" containing multiple hot words).

In some implementations, machine learning models trained to detect these dynamic hot words may be downloaded as needed. For example, in the timer example, when a user sets a timer (and prior to its expiration), the automated assistant may download to a local device a neural network that is already trained to detect (without first detecting invocation of default hot words) various timer-specific hot words (e.g., "stop," cancel the timer, etc.).

Additionally or alternatively, in some implementations, to improve the user experience and decrease latency, responsive actions that are meant to be performed by the automated assistant upon detection of context specific hot words may be pre-cached at a device at which a user is engaged with the automated assistant. That way, as soon as the context-specific hot word is detected, the automated assistant can take immediate action. This is in contrast to where the automated assistant first might need to connect with one or more computing systems (e.g., the cloud) to fulfill the user's request.

As an example, suppose an assistant device with a display includes one or more "cards" that correspond to currently-active context-specific hot words. Suppose one of the cards says "Weather today," and that the display of this card causes the context-specific hot word(s) "weather today" (or "today's weather", etc.) to be active, thereby allowing the user to say "weather today" to get today's weather without first invoking the automated assistant. Because this card is displayed (and more importantly, the context-specific hot word is active), the responsive action of requesting today's weather from a remote weather service may be performed ahead of time (without the user specifically requesting it) and the responsive data may be cached locally. Consequently, when the user does get around to saying, "weather today," data indicative of today's weather forecast is already retrieved, and the automated assistant can quickly assemble a natural language response without the latency caused by real-time communications with the remote weather service.

Techniques described herein give rise to a variety of technical advantages. Expanding the vocabulary that is available to invoke an automated assistant under certain circumstances, at least temporarily, may reduce the need to first invoke the automated assistant before causing it to perform some contextually relevant action, such as stopping a timer, pausing music, etc. Some existing assistant devices make it easy to pause media playback or stop a timer by allowing a user to simply tap on an active portion (e.g., a capacitive touchpad or display) of a surface of the device, without having to invoke the automated assistant first. However, users with physical disabilities and/or users who are otherwise occupied (e.g., cooking, driving, etc.) may not be able to easily touch the device. Accordingly, techniques described herein enable those users to more easily and quickly cause the automated assistant to perform some responsive action, such as stopping a timer, without invoking it first.

Additionally, as described herein, in some implementations, the automated assistant may proactively download content that is responsive to context-specific hot words. For example, when the automated assistant transitions into a specific content in which one or more cards with hot words are displayed (e.g., weather, traffic, schedule, etc.), information responsive to these hot words may be preemptively downloaded and cached in memory. Consequently, when the one or more hot words are uttered, the automated assistant is able to provide the responsive information more quickly than if the automated assistant had to first perform reach out over one or more networks to one or more remote resources to obtain the responsive information. This may also be beneficial when the assistant device is in a vehicle that may travel in/out of zones in which data network(s) are available. By preemptively downloading and caching content responsive to certain context-specific hot words, e.g., while the vehicle is in a data coverage zone, that data is then available if the user requests it while travelling outside of a data coverage zone.

As yet another example, techniques described herein may enable users to trigger responsive actions without requiring comprehensive speech-to-text ("STT") processing. For example, when certain contextual invocation models are activated and detect context-specific hot words, responsive action(s) may be triggered based on the output of these models, without requiring the user's utterance to be converted to text using STT processing. This may conserve computing resources on the client device, and/or may avoid a round-trip communication with cloud infrastructure to conduct STT and/or semantic processing of the user's utterance, which conserves network resources. Also, avoiding the round-trip transmission may improve latency and avoid sending at least some data to the cloud infrastructure, which may be advantageous and/or desirable from a user privacy standpoint.

In some implementations, a method performed by one or more processors is provided that includes: operating an automated assistant at least in part on a computing device; monitoring audio data captured by a microphone for one or more default hot words, wherein detection of one or more of the default hot words triggers transition of the automated assistant from a limited hot word listening state into a speech recognition state; detecting transition of the computing device into a given state; and in response to the detecting, monitoring the audio data captured by the microphone for one or more context-specific hot words, in addition to the one or more default hot words, wherein detection of one or more of the context-specific hot words triggers the automated assistant to perform a responsive action associated with the given state, without requiring detection of one or more of the default hot words or transition of the automated assistant into the speech recognition state.

These and other implementations of technology disclosed herein may optionally include one or more of the following features.

In various implementations, the given state may include expiration of a timer set by the automated assistant, and wherein detection of the one or more context-specific hot words triggers the automated assistant to cancel the timer. In various implementations, the given state may include media playback triggered via the automated assistant, and detection of the one or more context-specific hot words may cause the automated assistant to alter the media playback. In various implementations, alteration of the media playback may include one or more of pausing, playing, fast forwarding, rewinding, or changing volume.

In various implementations, the detecting may include determining that content has been rendered on a display of the computing device. In various implementations, the method may further include identifying the one or more context-specific hot words based on the content rendered on the display. In various implementations, identifying the one or more context-specific hot words based on the content rendered on the display may include determining one or more phonemes based on content rendered on the display. In various implementations, the one or more identified phonemes may be used to tune a trained machine learning model to accept one or more phonemes and reject one or more other phonemes.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
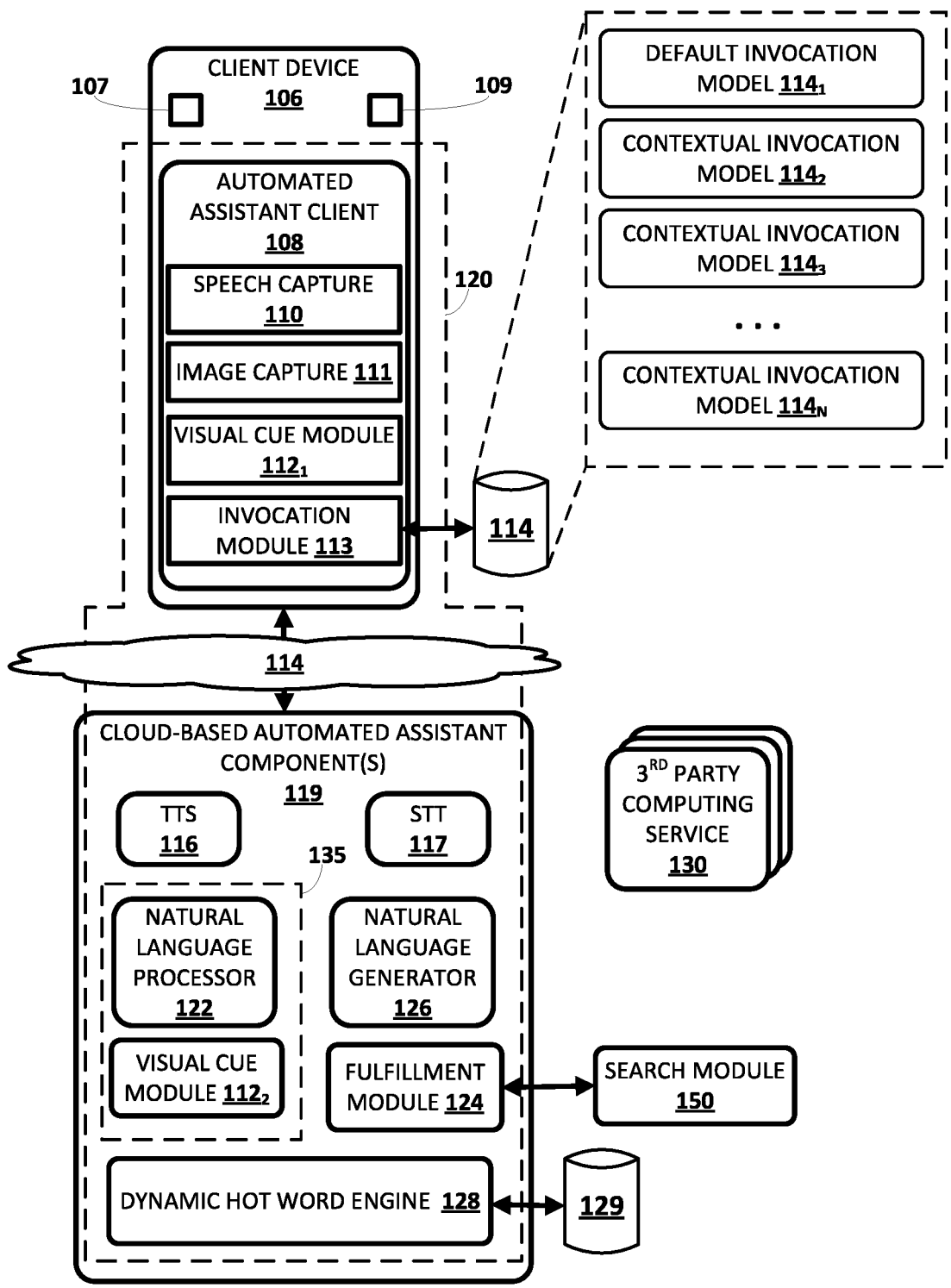
FIG. 1 is a block diagram of an example environment in which implementations disclosed herein may be implemented.

Now turning to FIG. 1, an example environment in which techniques disclosed herein may be implemented is illustrated. The example environment includes one or more client computing devices 106. Each client device 106 may execute a respective instance of an automated assistant client 108, which may also be referred to herein as a "client portion" of an automated assistant. One or more cloud-based automated assistant components 119, which may also be referred to herein collectively as a "server portion" of an automated assistant, may be implemented on one or more computing systems (collectively referred to as a "cloud" computing system) that are communicatively coupled to client devices 106 via one or more local and/or wide area networks (e.g., the Internet) indicated generally at 114.

In various implementations, an instance of an automated assistant client 108, by way of its interactions with one or more cloud-based automated assistant components 119, may form what appears to be, from the user's perspective, a logical instance of an automated assistant 120 with which the user may engage in a human-to-computer dialog. One instance of such an automated assistant 120 is depicted in FIG. 1 in dashed line. It thus should be understood that each user that engages with an automated assistant client 108 executing on a client device 106 may, in effect, engage with his or her own logical instance of an automated assistant 120. For the sakes of brevity and simplicity, the term "automated assistant" as used herein as "serving" a particular user will refer to the combination of an automated assistant client 108 executing on a client device 106 operated by the user and one or more cloud-based automated assistant components 119 (which may be shared amongst multiple automated assistant clients 108). It should also be understood that in some implementations, automated assistant 120 may respond to a request from any user regardless of whether the user is actually "served" by that particular instance of automated assistant 120.

The one or more client devices 106 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker (which in some cases may include a vision sensor), a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client computing devices may be provided. Some client devices 106, such as standalone interactive speakers (or "smart speakers"), may take the form of assistant devices that are primarily designed to facilitate dialog between users and automated assistant 120. Some such assistant devices may take the form of a standalone interactive speaker with an attached display, which may or may not be a touchscreen display.

In some implementations, client device 106 may be equipped with one or more vision sensors 107 having one or more fields of view, although this is not required. Vision sensor(s) 107 may take various forms, such as digital cameras, passive infrared ("PIR") sensors, stereoscopic cameras, RGBd cameras, etc. The one or more vision sensors 107 may be used, e.g., by an image capture module 111, to capture image frames (still images or video) of an environment in which client device 106 is deployed. These image frames may then be analyzed, e.g., by a visual cue module $112_1$, to detect user-provided visual cues contained in the image frames. These visual cues may include but are not limited to hand gestures, gazes towards particular reference points, facial expressions, predefined movements by users, etc. These detected visual cues may be used for various purposes, such as invoking automated assistant 120 and/or causing automated assistant 120 to take various actions.

As described in more detail herein, automated assistant 120 engages in human-to-computer dialog sessions with one or more users via user interface input and output devices of one or more client devices 106. In some implementations, automated assistant 120 may engage in a human-to-computer dialog session with a user in response to user interface input provided by the user via one or more user interface input devices of one of the client devices 106. In some of those implementations, the user interface input is explicitly directed to automated assistant 120. For example, a user may verbally provide (e.g., type, speak) a predetermined invocation phrase, such as "OK, Assistant," or "Hey, Assistant," to cause automated assistant 120 to begin actively listening or monitoring typed text. Additionally or alternatively, in some implementations, automated assistant 120 may be invoked based on one or more detected visual cues, alone or in combination with oral invocation phrases.

In some implementations, automated assistant 120 may engage in a human-to-computer dialog session in response to user interface input, even when that user interface input is not explicitly directed to automated assistant 120. For example, automated assistant 120 may examine the contents of user interface input and engage in a dialog session in response to certain terms being present in the user interface input and/or based on other cues. In many implementations, automated assistant 120 may utilize speech recognition to convert utterances from users into text, and respond to the text accordingly, e.g., by providing search results, general information, and/or taking one or more responsive actions (e.g., playing media, launching a game, ordering food, etc.). In some implementations, the automated assistant 120 can additionally or alternatively respond to utterances without converting the utterances into text. For example, the automated assistant 120 can convert voice input into an embedding, into entity representation(s) (that indicate entity/entities present in the voice input), and/or other "non-textual" representation and operate on such non-textual representation. Accordingly, implementations described herein as operating based on text converted from voice input may additionally and/or alternatively operate on the voice input directly and/or other non-textual representations of the voice input.

Each of client computing device 106 and computing device(s) operating cloud-based automated assistant components 119 may include one or more memories for storage of data and software applications, one or more processors for accessing data and executing applications, and other components that facilitate communication over a network. The operations performed by client computing device 106 and/or by automated assistant 120 may be distributed across multiple computer systems. Automated assistant 120 may be implemented as, for example, computer programs running on one or more computers in one or more locations that are coupled to each other through a network.

As noted above, in various implementations, client computing device 106 may operate an automated assistant client 108, or "client portion" of automated assistant 120. In various implementations, automated assistant client 108 may include a speech capture module 110, the aforementioned image capture module 111, a visual cue module 112$_1$, and/or an invocation module 113. In other implementations, one or more aspects of speech capture module 110, image capture module 111, visual cue module 112, and/or invocation module 113 may be implemented separately from automated assistant client 108, e.g., by one or more cloud-based automated assistant components 119. For example, in FIG. 1, there is also a cloud-based visual cue module 112$_2$ that may detect visual cues in image data.

In various implementations, speech capture module 110, which may be implemented using any combination of hardware and software, may interface with hardware such as a microphone 109 or other pressure sensor to capture an audio recording of a user's utterance(s). Various types of processing may be performed on this audio recording for various purposes. In some implementations, image capture module 111, which may be implemented using any combination of hardware or software, may be configured to interface with camera 107 to capture one or more image frames (e.g., digital photographs) that correspond to a field of view of the vision sensor 107.

In various implementations, visual cue module 112$_1$ (and/or cloud-based visual cue module 112$_2$) may be implemented using any combination of hardware or software, and may be configured to analyze one or more image frames provided by image capture module 111 to detect one or more visual cues captured in and/or across the one or more image frames. Visual cue module 112$_1$ may employ a variety of techniques to detect visual cues. For example, Visual cue module 112$_2$ may use one or more artificial intelligence (or machine learning) models that are trained to generate output indicative of detected user-provided visual cues in image frames.

Speech capture module 110 may be configured to capture a user's speech, e.g., via a microphone 109, as mentioned previously. Additionally or alternatively, in some implementations, speech capture module 110 may be further configured to convert that captured audio to text and/or to other representations or embeddings, e.g., using speech-to-text ("STT") processing techniques. Additionally or alternatively, in some implementations, speech capture module 110 may be configured to convert text to computer-synthesized speech, e.g., using one or more voice synthesizers. However, in some cases, because client device 106 may be relatively constrained in terms of computing resources (e.g., processor cycles, memory, battery, etc.), speech capture module 110 local to client device 106 may be configured to convert a finite number of different spoken phrases—particularly phrases that invoke automated assistant 120—to text (or to other forms, such as lower dimensionality embeddings). Other speech input may be sent to cloud-based automated assistant components 119, which may include a cloud-based text-to-speech ("TTS") module 116 and/or a cloud-based STT module 117.

In various implementations, invocation module 113 may be configured to determine whether to invoke automated assistant 120, e.g., based on output provided by speech capture module 110 and/or visual cue module 112$_1$ (which in some implementations may be combined with image capture module 111 in a single module). For example, invocation module 113 may determine whether a user's utterance qualifies as an invocation phrase that should initiate a human-to-computer dialog session with automated assistant 120. In some implementations, invocation module 113 may analyze data indicative of the user's utterance, such as an audio recording or a vector of features extracted from the audio recording (e.g., an embedding), alone or in conjunction with one or more visual cues detected by visual cue module 112$_1$. In some implementations, a threshold that is employed by invocation module 113 to determine whether to invoke automated assistant 120 in response to a vocal utterance may be lowered when particular visual cues are also detected. Consequently, even when a user provides a vocal utterance that is different from but somewhat phonetically similar to the proper invocation phrase, "OK assistant," that utterance may nonetheless be accepted as a proper invocation when detected in conjunction with a visual cue (e.g., hand waving by the speaker, speaker gazes directly into vision sensor 107, etc.).

In some implementations, one or more on-device invocation models, e.g., stored in an on-device model database 114, may be used by invocation module 113 to determine whether an utterance and/or visual cue(s) qualify as an invocation. Such an on-device invocation model may be trained to detect variations of invocation phrases/gestures. For example, in some implementations, the on-device invocation model (e.g., one or more neural networks) may be trained using training examples that each include an audio recording (or an extracted feature vector) of an utterance from a user, as well as data indicative of one or more image frames and/or detected visual cues captured contemporaneously with the utterance.

In FIG. 1, on-device model database 114 may store one or more on-device invocation models $114_1$-$114_N$. In some implementations, a default on-device invocation model $114_1$ may be trained to detect, in an audio recording or other data indicative thereof, one or more default invocation phrases, such as those mentioned previously (e.g., "OK Assistant," "Hey, Assistant," etc.). In some such implementations, these models may always be available and usable to transition automated assistant 120 into a general listening state in which any audio recording captured by speech capture module 110 (at least for some period of time following invocation) may be processed using other components of automated assistant 120 as described below (e.g., on client device 106 or by one or more cloud-based automated assistant components 119).

Additionally, in some implementations, on-device model database 114 may store, at least temporarily, one or more additional "contextual invocation models" $114_2$-$114_N$. These contextual invocation models $114_2$-$114_N$ may be used by and/or available to invocation module 113 in specific contexts. Contextual invocation models $114_2$-$114_N$ may be trained to detect, e.g., in an audio recording or other data indicative thereof, one or more context-specific hot words. In some implementations, contextual invocation models $114_2$-$114_N$ may be selectively downloaded on an as-needed basis, e.g., from a dynamic hot word engine 128 that forms part of cloud-based automated assistant components 119, as will be described in more detail below.

In various implementations, when invocation module 113 detects various dynamic hot words using contextual invocation models $114_2$-$114_N$, it may transition automated assistant 120 into the general listening state described previously. Additionally or alternatively, invocation module 113 may transition automated assistant 120 into a context-specific state in which one or context-specific responsive actions are performed with or without transitioning automated assistant 120 into the general listening state. In many cases, the audio data that triggered transition of automated assistant 120 into a context-specific state may not be transmitted to the cloud. Instead, one or more context-specific responsive actions may be performed entirely on client device 106, which may reduce both the response time and the amount of information that is transmitted to the cloud, which may be beneficial from a privacy standpoint.

Cloud-based TTS module 116 may be configured to leverage the virtually limitless resources of the cloud to convert textual data (e.g., natural language responses formulated by automated assistant 120) into computer-generated speech output. In some implementations, TTS module 116 may provide the computer-generated speech output to client device 106 to be output directly, e.g., using one or more speakers. In other implementations, textual data (e.g., natural language responses) generated by automated assistant 120 may be provided to speech capture module 110, which may then convert the textual data into computer-generated speech that is output locally.

Cloud-based STT module 117 may be configured to leverage the virtually limitless resources of the cloud to convert audio data captured by speech capture module 110 into text, which may then be provided to intent matcher 135. In some implementations, cloud-based STT module 117 may convert an audio recording of speech to one or more phonemes, and then convert the one or more phonemes to text. Additionally or alternatively, in some implementations, STT module 117 may employ a state decoding graph. In some implementations, STT module 117 may generate a plurality of candidate textual interpretations of the user's utterance. In some implementations, STT module 117 may weight or bias particular candidate textual interpretations higher than others depending on whether there are contemporaneously detected visual cues.

Automated assistant 120 (and in particular, cloud-based automated assistant components 119) may include intent matcher 135, the aforementioned TTS module 116, the aforementioned STT module 117, and other components that are described in more detail below. In some implementations, one or more of the modules and/or modules of automated assistant 120 may be omitted, combined, and/or implemented in a component that is separate from automated assistant 120. In some implementations, to protect privacy, one or more of the components of automated assistant 120, such as natural language processor 122, TTS module 116, STT module 117, etc., may be implemented at least on part on client devices 106 (e.g., to the exclusion of the cloud).

In some implementations, automated assistant 120 generates responsive content in response to various inputs generated by a user of one of the client devices 106 during a human-to-computer dialog session with automated assistant 120. Automated assistant 120 may provide the responsive content (e.g., over one or more networks when separate from a client device of a user) for presentation to the user as part of the dialog session. For example, automated assistant 120 may generate responsive content in response to free-form natural language input provided via client device 106. As used herein, free-form input is input that is formulated by a user and that is not constrained to a group of options presented for selection by the user.

As used herein, a "dialog session" may include a logically-self-contained exchange of one or more messages between a user and automated assistant 120 (and in some cases, other human participants). Automated assistant 120 may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-activated product), locking/sleeping of the client device between sessions, change of client devices used to interface with one or more instances of automated assistant 120, and so forth.

An intent matcher 135 may be configured to determine a user's intent based on input(s) (e.g., vocal utterances, visual cues, etc.) provided by the user and/or based on other signals, such as sensor signals, online signals (e.g., data obtained from web services), and so forth. In some implementations, intent matcher 135 may include a natural language processor 122 and the aforementioned cloud-based visual cue module $112_2$. In various implementations, cloud-based visual cue module $112_2$ may operate similarly to visual cue module $112_1$ except that cloud-based visual cue module $112_2$ may have more resources at its disposal. In particular, cloud-based visual cue module $112_2$ may detect visual cues that may be used by intent matcher 135, alone or in combination with other signals, to determine a user's intent.

Natural language processor 122 may be configured to process natural language input generated by user(s) via client device 106 and may generate annotated output (e.g., in textual form) for use by one or more other components of automated assistant 120. For example, the natural language processor 122 may process natural language free-form input that is generated by a user via one or more user interface input devices of client device 106. The generated annotated output includes one or more annotations of the natural language input and one or more (e.g., all) of the terms of the natural language input.

In some implementations, the natural language processor 122 is configured to identify and annotate various types of grammatical information in natural language input. For example, the natural language processor 122 may include a morphological module that may separate individual words into morphemes and/or annotate the morphemes, e.g., with their classes. Natural language processor 122 may also include a part of speech tagger configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser (not depicted) configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the natural language processor 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. For example, a "banana" node may be connected (e.g., as a child) to a "fruit" node," which in turn may be connected (e.g., as a child) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge (e.g., representing a child-to-parent relationship) to one or more other nodes, such as a "restaurant" node, a "business" node, a node representing a city and/or state in which the restaurant is located, and so forth.

The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 122 may rely on annotations from one or more other components of the natural language processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations.

Intent matcher 135 may use various techniques to determine an intent of the user, e.g., based on output from natural language processor 122 (which may include annotations and terms of the natural language input) and/or based on output from visual cue module (e.g., $112_1$ and/or $112_2$). In some implementations, intent matcher 135 may have access to one or more databases (not depicted) that include, for instance, a plurality of mappings between grammars, visual cues, and responsive actions (or more generally, intents). In many cases, these grammars may be selected and/or learned over time, and may represent the most common intents of users. For example, one grammar, "play <artist>", may be mapped to an intent that invokes a responsive action that causes music by the <artist> to be played on the client device 106 operated by the user. Another grammar, "[weather|forecast] today," may be match-able to user queries such as "what's the weather today" and "what's the forecast for today?"

In addition to or instead of grammars, in some implementations, intent matcher 135 may employ one or more trained machine learning models, alone or in combination with one or more grammars and/or visual cues. These trained machine learning models may also be stored in one or more databases and may be trained to identify intents, e.g., by embedding data indicative of a user's utterance and/or any detected user-provided visual cues into a reduced dimensionality space, and then determining which other embeddings (and therefore, intents) are most proximate, e.g., using techniques such as Euclidean distance, cosine similarity, etc.

As seen in the "play <artist>" example grammar, some grammars have slots (e.g., <artist>) that can be filled with slot values (or "parameters"). Slot values may be determined in various ways. Often users will provide the slot values proactively. For example, for a grammar "Order me a <topping> pizza," a user may likely speak the phrase "order me a sausage pizza," in which case the slot <topping> is filled automatically. Additionally or alternatively, if a user invokes a grammar that includes slots to be filled with slot values, without the user proactively providing the slot values, automated assistant 120 may solicit those slot values from the user (e.g., "what type of crust do you want on your pizza?"). In some implementations, slots may be filled with slot values based on visual cues detected by visual cue modules $112_{1-2}$. For example, a user could utter something like "Order me this many cat bowls" while holding up three fingers to visual sensor 107 of client device 106. Or, a user could utter something like "Find me more movies like this" while holding of a DVD case for a particular movie.

In some implementations, automated assistant 120 may serve as an intermediary between users and one or more third party computing services 130 (or "third party agents", or "agents"). These third party computing services 130 may be independent software processes that receive input and provide responsive output. Some third party computing services may take the form of third party applications that may or may not operate on computing systems that are separate from those that operate, for instance, cloud-based automated assistant components 119. One kind of user intent that may be identified by intent matcher 135 is to engage a third party computing service 130. For example, automated assistant 120 may provide access to an application programming interface ("API") to a service for controlling a smart device. A user may invoke automated assistant 120 and provide a command such as "I'd like to turn the heating on." Intent matcher 135 may map this command to a grammar that triggers automated assistant 120 to engage with the third party service, thereby to cause the user's heating to be switched on. The third party service 130 may provide automated assistant 120 with a minimum list of slots that need to be filled in order to fulfill (or "resolve") a command to turn the heating on. In this example, the slots may include the temperature to which the heating is to be set, and a duration for which the heating is to be on. Automated assistant 120 may generate and provide to the user (via client device 106) natural language output that solicits parameters for the slots.

Fulfillment module 124 may be configured to receive the predicted/estimated intent that is output by intent matcher 135, as well as an associated slot values (whether provided by the user proactively or solicited from the user) and fulfill (or "resolve") the intent. In various implementations, fulfillment (or "resolution") of the user's intent may cause various fulfillment information (also referred to as "responsive" information or "resolution information") to be generated/obtained, e.g., by fulfillment module 124. As will be described below, the fulfillment information may in some implementations be provided to a natural language generator ("NLG" in some Figs.) 126, which may generate natural language output based on the fulfillment information.

Fulfillment (or "resolution") information may take various forms because an intent can be fulfilled (or "resolved") in a variety of ways. Suppose a user requests pure information, such as "Where were the outdoor shots of 'The Shining' filmed?" The intent of the user may be determined, e.g., by intent matcher 135, as being a search query. The intent and content of the search query may be provided to fulfillment module 124, which as depicted in FIG. 1 may be in communication with one or more search modules 150 configured to search corpuses of documents and/or other data sources (e.g., knowledge graphs, etc.) for responsive information. Fulfillment module 124 may provide data indicative of the search query (e.g., the text of the query, a reduced dimensionality embedding, etc.) to search module 150. Search module 150 may provide responsive information, such as GPS coordinates, or other more explicit information, such as "Timberline Lodge, Mt. Hood, Oregon." This responsive information may form part of the fulfillment information generated by fulfillment module 124.

Additionally or alternatively, fulfillment module 124 may be configured to receive, e.g., from intent matcher 135, a user's intent and any slot values provided by the user or determined using other means (e.g., GPS coordinates of the user, user preferences, etc.) and trigger a responsive action. Responsive actions may include, for instance, ordering a good/service, starting a timer, setting a reminder, initiating a phone call, playing media, sending a message, etc. In some such implementations, fulfillment information may include slot values associated with the fulfillment, confirmation responses (which may be selected from predetermined responses in some cases), etc.

Natural language generator 126 may be configured to generate and/or select natural language output (e.g., words/phrases that are designed to mimic human speech) based on data obtained from various sources. In some implementations, natural language generator 126 may be configured to receive, as input, fulfillment information associated with fulfillment of an intent, and to generate natural language output based on the fulfillment information. Additionally or alternatively, natural language generator 126 may receive information from other sources, such as third party applications (e.g., required slots), which it may use to compose natural language output for the user.

Figure 2:
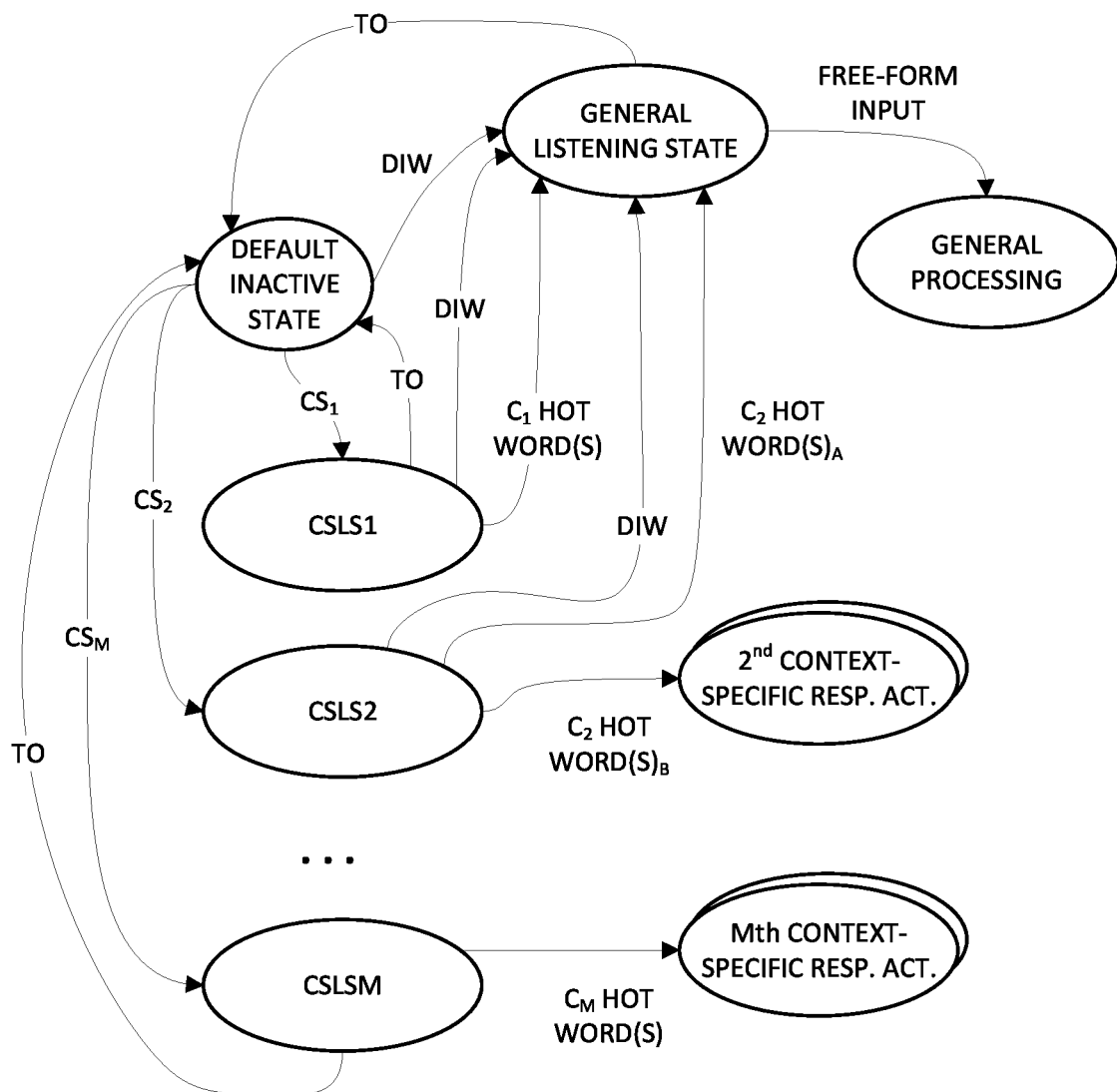
FIG. 2 depicts an example of a state machine that may be implemented by an automated assistant configured with selected aspects of the present disclosure, in accordance with various implementations.

FIG. 2 schematically depicts an example state machine that may be implemented by an automated assistant (e.g., 120) and/or an assistant device (e.g., 106) configured with selected aspects of the present disclosure, in accordance with various implementations. At top left is a "default inactive state" in which automated assistant 120 may reside when not being engaged by a user. In the default inactive state, one or more microphones of one or more client devices (106) may be activated, and audio data it captures may be analyzed using techniques described herein. Automated assistant 120 may be transitioned into a "general listening state" in response to detection, e.g., by invocation module 113 and/or visual cue module 112 based on default invocation model $114_1$, of one or more default invocation words ("DIW" in FIG. 2, also referred to herein as "hot words"), such as "OK, Assistant," or "Hey, Assistant." Utterances other than the default hot words (e.g., ambient conversation, etc.) may be ignored and not processed.

In the general listening state, automated assistant 120 may capture audio data uttered after the default invocation word(s) and transition into a "general processing" state. In the general processing state, automated assistant 120 may process data indicative of audio input as described previously with respect to FIG. 1, including STT processing, natural language processing, intent matching, fulfillment, etc. Once the processing is complete, automated assistant 120 may transition back into the default inactive state. If no audio input is received after detection of the default invocation word(s), then a timeout ("TO" in FIG. 2) may transition automated assistant 120 from the general listening state back into the default inactive state, e.g., so that later utterances not intended for processing by automated assistant are not captured or processed.

As noted previously, techniques described herein facilitate context-specific hot words that can be activated and detected to transition automated assistant 120 to a variety of different states, such as the general listening state or to other context-specific states in which automated assistant 120 performs various actions. In some implementations, in certain contexts, the vocabulary of invocation words that can be uttered to transition automated assistant 120 from the default inactive state to the general listening state may be expanded, at least temporarily (e.g., for a limited amount of time, until the context is no longer applicable, etc.).

For example, in FIG. 2, a first context-specific signal $CS_1$ may transition automated assistant 120 from the default inactive state into a first context-specific listening state, "CSLS1." In CSLS1, automated assistant 120 may listen for both default invocation word(s) ("DIW") and first context-specific hot words ("$C_1$ hot words"). If either are detected, automated assistant 120 may transition to the general listening state as described above. Thus, in the first context-specific listening state, the vocabulary of hot words that will transition automated assistant 120 into the general listening state is expanded to include both the default invocation word(s) and the first context-specific hot words. Also, in some implementations, if a sufficient amount of time passes while automated assistant 120 is in the first context-specific listening state without detection of activated hot words, then a timeout ("TO") may transition automated assistant 120 back into the default inactive state.

Additionally or alternatively, in some implementations, in certain contexts, automated assistant 120 may be transitionable into either the general listening state, e.g., using an expanded vocabulary of hot words, or into a context-specific state in which one or context-specific actions may be performed. For example, in FIG. 2, automated assistant 120 may be transitioned from the default inactive state into a second context-specific listening state, "CSLS2," in response to a second contextual signal ("$CS_2$"). In this second context-specific listening state, automated assistant 120 may be transitioned to the general listening state, e.g., by detecting one or more default invocation words and/or in some cases, one or more second context-specific hot words ("C2 hot word(s)$_A$") that effectively expand the vocabulary that is usable to transition automated assistant 120 into the general listening state.

Additionally or alternatively, automated assistant 120 may be transitioned from the second context-specific state ("CSLS2") into one or more states in which one or more second context-specific responsive actions ("$2^{nd}$ context-specific resp. act.") are performed, e.g., in response to one or more additional second context-specific hot words ("C2 hot word(s)$_B$"). Example responsive actions will be described below. In some implementations, specific second-context specific hot words may be mapped to specific second-context specific responsive actions, though this is not required. Although not depicted in FIG. 2 for the sake of clarity, in some implementations, after performance of these one or more second context-specific responsive actions, automated assistant 120 may transition back into the default inactive state.

In some implementations, in certain contexts, automated assistant 120 may no longer listen for the default hot words. Instead, automated assistant 120 may only listen for context-specific hot words and perform responsive actions. For example, in FIG. 2, automated assistant 120 may be transitioned from the default inactive state into an Mth context-specific listening state (M is a positive integer), "CSLSM," in response to an Mth contextual signal ("$CS_M$"). In this state, automated assistant 120 may listen for Mth context-specific hot words ("$C_M$ hot word(s)"). In response to detecting one or more Mth context-specific hot words, automated assistant 120 may perform one or more Mth context-specific responsive actions ("Mth context-specific resp. act.").

In various implementations, automated assistant 120 may activate context-specific hot words in various ways. For example, and referring to both FIGS. 1 and 2, in some implementations, upon transition into a specific context, automated assistant 120 may download, e.g., from dynamic hot word engine 128, one or more context-specific machine learning models or classifiers (e.g., $114_2$, $114_3$, . . . , $114_N$), such as neural networks, hidden Markov models, etc., that are pre-trained to detect hot words that are to be activated in that particular context. For example, suppose that in a particular context, a vocabulary that transitions automated assistant 120 from the default inactive state to the general listening state is expanded to include the word, "howdy." In various implementations, automated assistant 120 may obtain, e.g., from dynamic hot word engine 128, a classifier that is trained to generate output indicative of whether the word "howdy" was detected. In various implementations this classifier may be binary (e.g., output "1" if the hot word is detected, "0" otherwise), or may generate a probability. If the probability satisfies some confidence threshold, then the hot word may be detected.

Additionally or alternatively, in some implementations, one or more on-device models 114 may take the form of a dynamic hot word classifier/machine learning model (e.g., a neural network, hidden Markov model, etc.) that is tunable on the fly to generate one output for one or more predetermined phonemes, and to generate another output for other phonemes. Suppose the hot word "howdy" is to be activated. In various implementations, the dynamic hot word classifier may be tuned, e.g., by altering one or more parameters and/or providing specific input alongside or embedded with the audio data, to "listen" for the phonemes "how" and "dee." When those phonemes are detected in audio input, the dynamic hot word classifier may generate output that triggers automated assistant 120 to take responsive action, such as transitioning into the general listening state, performing some context-specific responsive action, etc. Other phonemes may generate output that is ignored or disregarded. Additionally or alternatively, output may be generated by the dynamic hot word classifier only in response to activated phonemes, and other phonemes may not generate output at all.

Figure 3A:
FIG. 3A, FIG. 3B, FIG. 4A, FIG. 4B, FIG. 5A, FIG. 5B, and FIG. 6 additional example scenarios in which disclosed techniques may be employed.
Figure 3B:

FIGS. 3A and 3B demonstrate one example of how a human-to-computer dialog session between user 101 and an instance of automated assistant (not depicted in FIGS. 3A-B) may occur, via the microphone(s) and speaker(s) of a client computing device 306 (depicted as a standalone interactive speaker but this is not meant to be limiting) according to implementations described herein. One or more aspects of automated assistant 120 may be implemented on the computing device 306 and/or on one or more computing devices that are in network communication with the computing device 306.

In FIG. 3A, user 101 ("Dave") provides natural language input of "Hey assistant, set a timer for five minutes" in a human-to-computer dialog session between the user 101 and automated assistant 120. Automated assistant 120 replies, "OK. Timer starting . . . now" and initiates a five-minute timer. In some implementations, the fact that a timer is set (and has not yet expired) may suffice as a contextual signal (e.g., "CS2" in FIG. 2) that transitions automated assistant into a context-specific state related to the timer. In this state, user 101 can still invoke automated assistant 120 with one or more default invocation words. However, user 101 may also now be able to trigger a context-specific responsive action of, for instance, stopping the timer, e.g., by uttering one or more expanded context-specific hot words, such as "stop the timer," "cancel the timer," or simply "stop."

Additionally or alternatively, in some implementations, while the timer is counting down, automated assistant 120 may remain in the default inactive state, and therefore may only be responsive to default hot word(s). However, once the timer expires, as is illustrated in FIG. 3B ("BEEEP!!! BEEEP!!! BEEEP!!!"), automated assistant 120 may transition into a context-specific state in which user 101 can, without first transitioning automated assistant 120 from the default inactive state to the general listening state, utter one or more context-specific hot words to stop the timer (e.g., as a context-specific responsive action). For example, in FIG. 3B, user 101 utters the phrase "stop the timer" without first invoking automated assistant 120 into the general listening state. Nonetheless, automated assistant 120 stops the timer.

Figure 4A:
Figure 4B:

FIGS. 4A-B depict another example in which techniques described herein may be implemented. Once again a user 101 engages with automated assistant 120 that operates at least in part on client device 306. In FIG. 4A, user 101 utters, "Hey assistant, play 'We Wish You a Merry Christmas.'" In response, automated assistant 120 initiates playback of the song on client device 306, and transitions to a music-playback context (at least while the song is playing). In other words, playback of the music constitutes a contextual signal ("CS" in FIG. 2) that transitions automated assistant 120 into the music playback context.

In the music playback context, user 101 may be able to utter one or more context-specific hot words that were activated upon transition into the music playback context, e.g., to control the music playback. For example, as shown in FIG. 4B, user 101 may utter something like "fast forward thirty seconds," without first invoking automated assistant 120. Nonetheless, automated assistant 120 may skip ahead thirty seconds in response. Other hot words that may be active in such a context include but are not limited to "stop," "pause," "rewind <time increment>," "turn up/down the volume," etc.

Figure 5A:
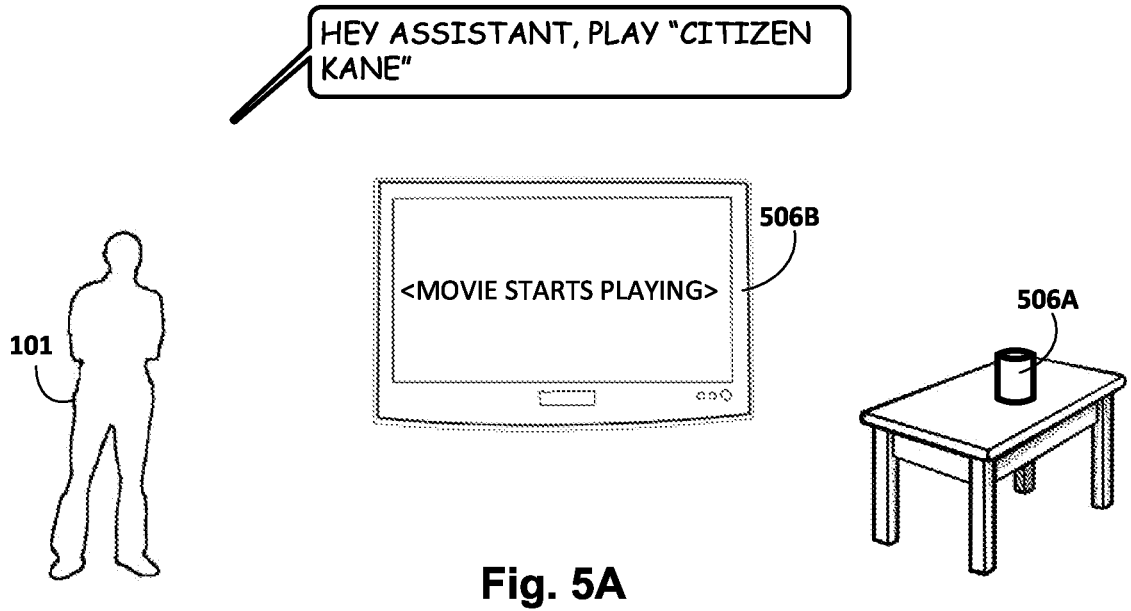
Figure 5B:
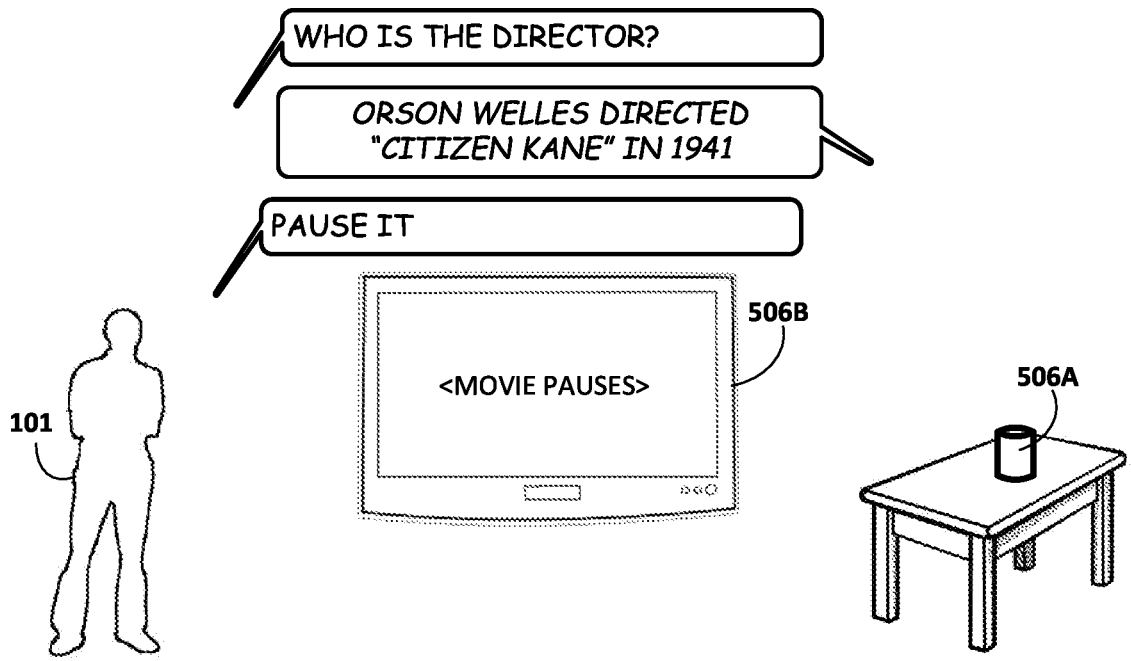

FIGS. 5A-B depict another example scenario in which techniques described herein may be employed, e.g., in a manner similar to FIGS. 4A-B. This time user 101 engages with a first client device 506A (taking the form of a standalone interactive speaker) configured with selected aspects of the present disclosure to control movie playback on a second client device 506B (taking the form of a smart television or "dumb" television equipped with a fob or another assistant-enabled device). In FIG. 5A, user 101 says, "Hey assistant, play 'Citizen Kane'." Automated assistant 120 responds by starting playback of the requested movie on second client device 506B.

In FIG. 5B, user 101 asks, "who is the director?", without invoking automated assistant 120 first. Nonetheless, automated assistant 120 may be in a movie playback state in which various context-specific hot words, including "director," are active to cause automated assistant 120 to perform a responsive action. In this example, automated assistant 120 responds, e.g., by way of audio output from first client device 506A, "Orson Welles directed 'Citizen Kane' in 1941." In FIG. 5B, user 101 then says, "Pause it," again without first invoking automated assistant 120, and automated assistant 120 pauses playback. Other hot words that might be active in such a context include, but are not limited to, "fast forward <time period>," "start over," "rewind," etc.

In some implementations, the context may change—causing corresponding changes to activated context-specific hot words—while the user 101 consumes video playback (or audio playback in other implementations). For example, suppose user 101 is watching a gameshow instead of a movie. During different stages of the gameshow, different hot words may be activated, e.g., based on the content of the gameshow, so that user 101 is able to play along. Suppose during a gameshow that a contestant is presented with a question about a historical event, scientific fact, etc. In some implementations, automated assistant 120 may, behind the scenes, perform a web search to determine a likely answer to the question, and then may activate one or more hot words pertinent to the answer. If user 101 utters one or more of those hot words, even without invoking automated assistant 120, automated assistant 120 may provide feedback (e.g., "that is correct," "that is incorrect," "I wasn't able to find out, let's see what happens," etc.).

Figure 6:
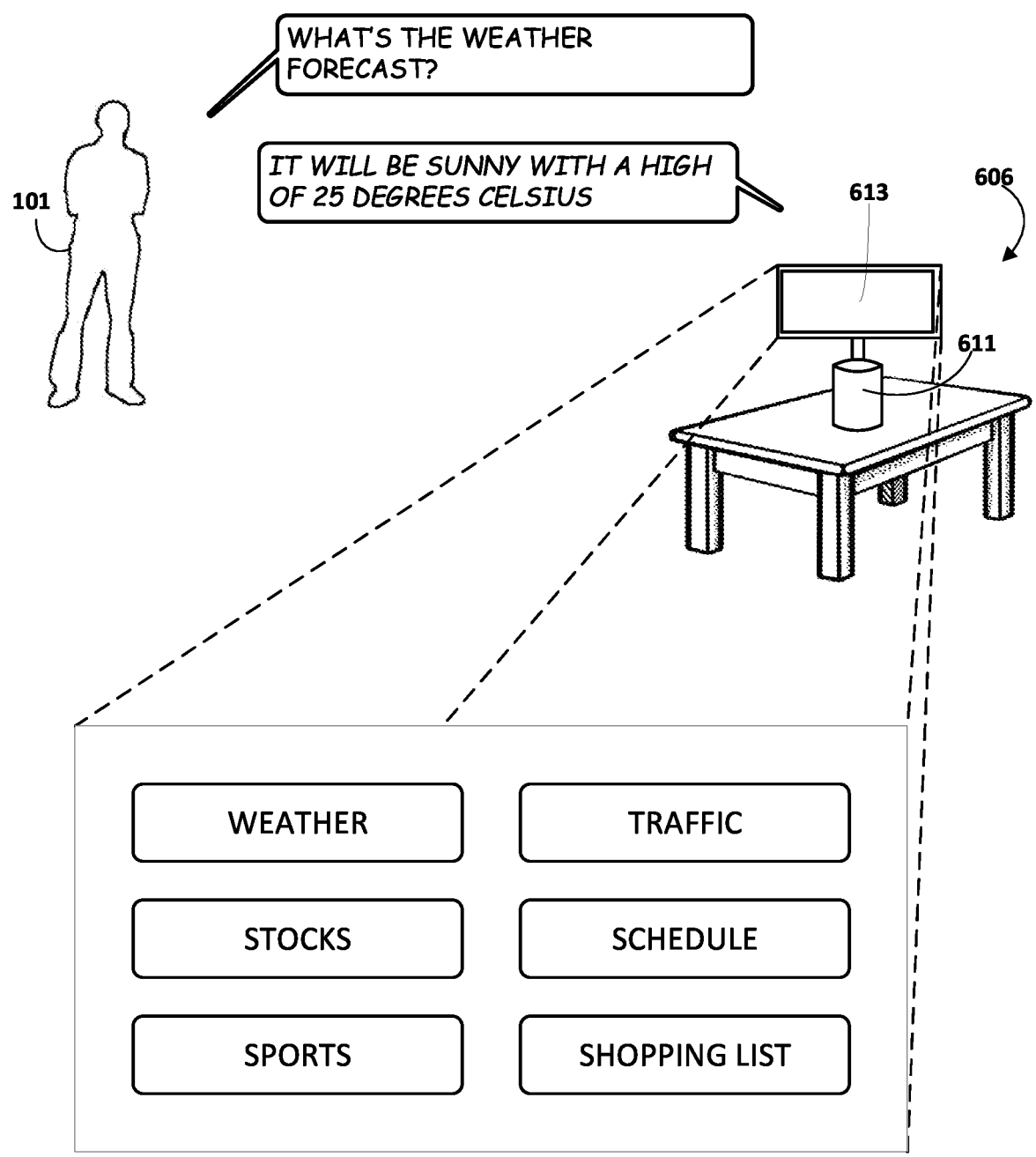

FIG. 6 depicts another example of hot words being activated dynamically based on context. In FIG. 6, user 101 engages with a client device 606 taking the form of a standalone assistant device that includes a microphone (not depicted), speaker 611, and display 613. In various implementations, display 613 may or may not be a touch screen display that renders graphical elements (e.g., cards) that facilitate and/or enhance engagement with automated assistant 120. For example, in FIG. 6, display 613 renders a series of selectable cards, "Weather," "Stocks," "Sports," "Traffic," "Schedule," and "Shopping list." These are not meant to be limiting, and some may be added or omitted, e.g., in favor of others not depicted in FIG. 6. Moreover, in some implementations, the cards may be customized to a particular user, e.g., by the user himself or herself or based on other signals (e.g., search history, prior engagement with automated assistant 120, etc.).

In various implementations, a user may select a given card, e.g., by touching it on display 613 and/or by uttering one or more hot words that are, for instance, rendered as part of the card. For example, in FIG. 6, user 101 may utter the phrase, "What's the weather forecast?", without first invoking automated assistant 120. Automated assistant 120 responds, "It will be sunny with a high of 25 degrees Celsius." Because a card entitled "weather" is already rendered on display 613, the hot word "weather" may be activated already, making it possible for user 101 to utter a phrase containing the word "weather" to cause automated assistant 120 to perform a context-specific task (reporting the weather forecast).

In some implementations, automated assistant 120 may preemptively download and cache responsive content before or upon transitioning into a particular context. For example, in FIG. 6, automated assistant 120 may proactively (i.e., without human intervention) download, from various remote and/or local sources, responsive content for general queries relating to weather, stocks, sports, traffic, schedule (which may include obtaining data from sources that are personal to user 101), and shopping list, e.g., contemporaneously with rendering the cards on display 613. This preemptive downloading may enable automated assistant 120 to respond much more quickly to utterances from user 101 that include one or more dynamic hot words that correspond to one or more of the cards. This may be particularly advantageous in scenarios in which data connectivity may be lost, such as if the client device is being carried in a moving automobile.

In some implementations in which a context of automated assistant 120 depends on content rendered on a display, as is the case with FIG. 6, it may be necessary to quickly adapt automated assistant 120 to listen for any number of new words or phrases. It may not necessarily be the case that there are pre-trained models available for all the potential words/phrases. Moreover, even if some pre-trained models are available at dynamic hot word index 129, client device 106 may lack a data connection over which it can download the models it needs in a particular context. Accordingly, in various implementations, the aforementioned dynamic hot word classifier/machine learning model (e.g., a neural network) that is tunable on the fly to generate one output for one or more predetermined phonemes, and to generate another output for other phonemes, may be activated to trigger invocation of automated assistant 120.

In addition to or instead of dynamically listening for content of a limited number of cards, as are depicted in FIG. 6, such a dynamic hot word classifier/machine learning model could be used to listen for a wide range of potential hot word(s). For example, suppose user 101 operates client device 606 in FIG. 6 to navigate to a particular web page or third party app (e.g., to order pizza). Or, alternatively, user 101 could navigate his phone (not depicted) or another client device to the website. In either case, the content of the displayed web page may be analyzed to determine various hot words that should be activated while the web page is displayed. These hot words may be selected in various ways, such as from HTML tags (e.g., headings, link text, etc.), word/term frequency on the page, and so forth. The dynamic hot word classifier/machine learning model can be tuned dynamically to listen for phonemes from these selected words, and ignore other phonemes. In this manner it is possible to dynamically activate hot words in any number of varying contexts. Additionally or alternatively, in some implementations, technologies such as VoiceXML may be employed to dynamically activate particular grammars on the fly.

While implementations described herein have been focused on causing automated assistant 120 to take various actions (e.g., search for information, control media playback, stop a timer, etc.) in response to context-specific hot words, this is not meant to be limiting. Techniques described herein may be extended to other use cases. For example, techniques described herein may be applicable when a user wishes to fill in a form field, e.g., on a search web page. In some implementations, when a search bar or other similar textual input element is present in a web page, one or more additional context-specific hot words may be activated. For example, when a user navigates an assistant-enabled device to a web page having a search bar, the hot words "search for" may be activated, e.g., so that the user can simply say "search for <desired topic>" and the user's utterance following "search for" can be transcribed into the search bar automatically, without the user needing to invoke automated assistant 120 first.

As another category of use cases, recall that a user may engage with automated assistant 120 to interface with one or more third party applications 130, e.g., to order goods or services. In some implementations, a third party application 130 may have its own context-specific hot word(s) that are activated whenever automated assistant 120 connects to the third party application 130. These context-specific hot words may cause automated assistant 120 to transition into a general listening state, and/or may invoke one or more context-specific actions that are specific to the third party application 130.

As an example, suppose a user engages with automated assistant 120 to order a ride on a third party ride sharing service (e.g., "OK Assistant, book me a ride to the airport."). When automated assistant 120 engages with a third party application 130 that facilitates ride sharing services, the third party application 130 may identify one or more hot words that the aforementioned dynamic hot word classifier/machine learning model should "listen" for. Additionally or alternatively, the third party application 130 may provide automated assistant 120 with one or more pre-trained models. Automated assistant 120 may activate these models at least temporarily while the transaction with the ride sharing application is active, e.g., until the vehicle arrives, or until the vehicle drops off the user at the requested location. Thus, for example, while the user waits for his or her ride to arrive, he or she may utter things like "how long till my ride gets here?" or "ETA?", without invoking automated assistant 120 first. Automated assistant 120 may invoke one or more context-specific responsive actions, which may be associated with the third party application 130, in order to respond to the user's request.

In various implementations, transition of a computing device into a particular context may activate, in addition to or instead of one or more context-specific hot words, one or more context-specific gestures. For example, suppose a webpage being viewed on display 613 includes one or more illustrated hand gestures. In various implementations, machine learning models that are trained to detect these gestures in visual data, e.g., captured by image capture module 111 in FIG. 1, may be downloaded and/or activated. For at least some time after activation, a user may be able to make one or more of the gestures. Detection of those gestures, e.g., by invocation module 113, may trigger transition of automated assistant 120 into the general listening state and/or cause automated assistant 120 to perform some context-specific responsive action.

In addition to or instead of the specific context and/or contextual signals examples described herein, other contexts and/or contextual signals may be employed with techniques described herein. In some implementations, a context may comprise a period of time or time interval, and contextual signal may comprise transition of time into that time interval. For example, in some implementations, a particular context may become active at a particular point in the evening, such as when a user typically goes to bed. The user may, without uttering one or more default hot words, give a command such as "good night" or "I'm going to bed." These commands may include hot words that are activated during this time interval (e.g., bedtime). In some such implementations, these temporally-specific contextual commands may trigger one or more routines, e.g., shutting down a plurality of smart appliances (e.g., smart lights), setting a thermostat to a particular temperature, turning on/off one or more fans, activating a security system and/or one or more cameras, etc.

As another example, in some implementations, hardware on a device itself may be manipulable to activate one or more context-specific hot words. For example, when a user engages a fastener or snap of an assistant-enabled smart watch, that may trigger a hardware signal (e.g., closing a circuit, magnetic signal, etc.) that causes one or more custom hot words to be activated, in addition to or instead of one or more default hot words that may or may not be available prior to the engagement. As another example, a user adorning a pair of smart glasses may trigger a hardware signal that causes one or more dynamic hot words to be activated. As yet another example, a vehicular-based assistant device may be transitioned into a state in which additional or alternative hot words are activated based on signals from the vehicle, such as the vehicle being turned on, a passenger sitting in a seat (e.g., detected by a weight sensor), the vehicle being operated at a particular speed or range of speeds, a mapping application being operated or in use (e.g., a driver could say "find alternative route" without using default hot words if the driver encounters traffic), and so forth.

Figure 7:
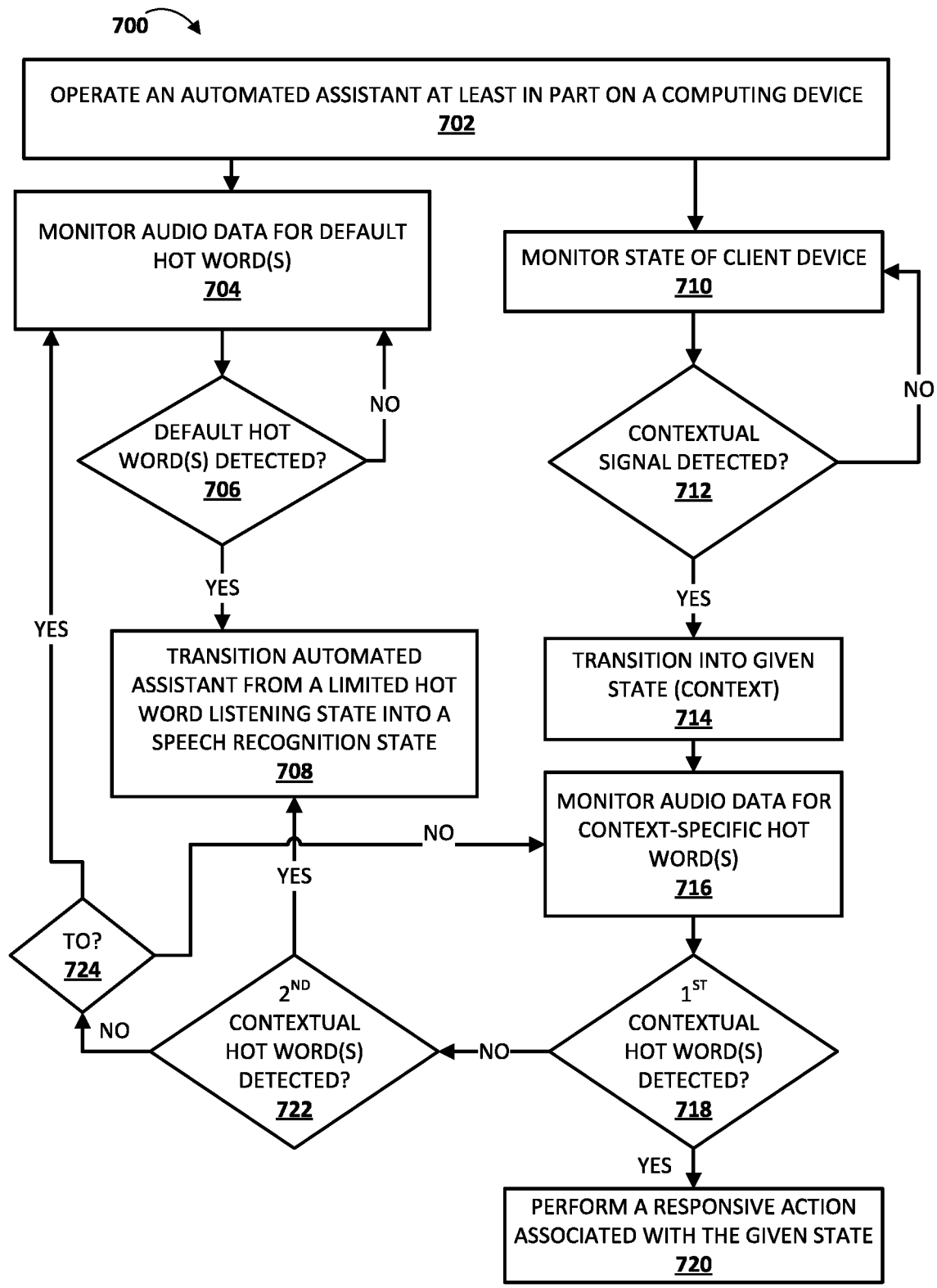
FIG. 7 depicts a flowchart illustrating an example method according to implementations disclosed herein.

FIG. 7 is a flowchart illustrating an example method 700 according to implementations disclosed herein. For convenience, the operations of the flow chart are described with reference to a system that performs the operations. This system may include various components of various computer systems, such as one or more components of automated assistant 120. Moreover, while operations of method 700 are shown in a particular order, this is not meant to be limiting. One or more operations may be reordered, omitted or added.

At block 702, the system may operate automated assistant 120 at least in part on a computing device (e.g., client device 106, 306, 506, 606). For example, and as noted above, in many cases automated assistant 120 may be implemented in part on client device 106 and in part on the cloud (e.g., cloud-based automated assistant components 119). At block 704, the system may monitor audio data captured by a microphone (e.g., 109) for one or more default hot words. For example, the audio data (or other data indicative thereof, such as an embedding) may be applied as input across one or more currently-active invocation models 114 to generate output. The output may indicate detection (block 706) of one or more of the default hot words. At block 708, the system may transition automated assistant 120 from a limited hot word listening state (e.g., default inactive state in FIG. 2) into a speech recognition state (e.g., general listening state in FIG. 2).

In some implementations, parallel to (or in series with) the operations of blocks 704-708, the system may, at block 710 monitor a state of the client device. For example, the system may monitor for one or more contextual signals, such as setting/expiration of a timer, initiation of media playback, interaction between automated assistant 120 and a third party application 130, time-of-day, detected user presence, and so forth.

If, at block 712, the system detects a contextual signal, then at block 714, the system may transition the computing device into a given state. For example, the system may detect a contextual signal such as a timer going off (or being set), music playback, content being rendered on a display, etc. After the transition of block 714, at block 716 the system may monitor the audio data captured by the microphone for one or more context-specific hot words, in addition to or instead of the one or more default hot words monitored for at block 704.

As noted previously, in some contexts, some hot words may transition automated assistant 120 into a general listening state, and other hot words may cause automated assistant 120 to perform a context-specific responsive action (e.g., stop the timer, pause media playback, etc.). Accordingly, at block 718, if the system detects a first one or more contextual hot words (e.g., hot words intended to cause automated assistant 120 to perform a context-specific task), then at block 720, the system may perform, or cause automated assistant 120 to perform, one or more context-specific responsive actions. On the other hand, if the first one or more contextual hot words are not detected at block 718, but a second one or more contextual hot words (e.g., hot words intended to simply invoke automated assistant 120 generally) are detected at block 722, then method 700 may proceed back to block 706, where automated assistant 120 is in the general listening state.

In some implementations, one or more timeouts may be employed to ensure that automated assistant 120 returns to a stable or default if no context-specific actions are requested. For example, if no first or second context-specific hot words are detected at blocks 718 and 722, respectively, then at block 724 a determination may be made as to whether a timeout expired (e.g., ten seconds, thirty seconds, one minute, etc.). If the answer at block 724 is yes, then method 700 may transition back to block 704, at which automated assistant 120 is transitioned into the default inactive state. However, if the answer at block 724 is no, then in some implementations, method 700 may proceed back to block 716, at which point the system may monitor for context-specific hot words.

Figure 8:
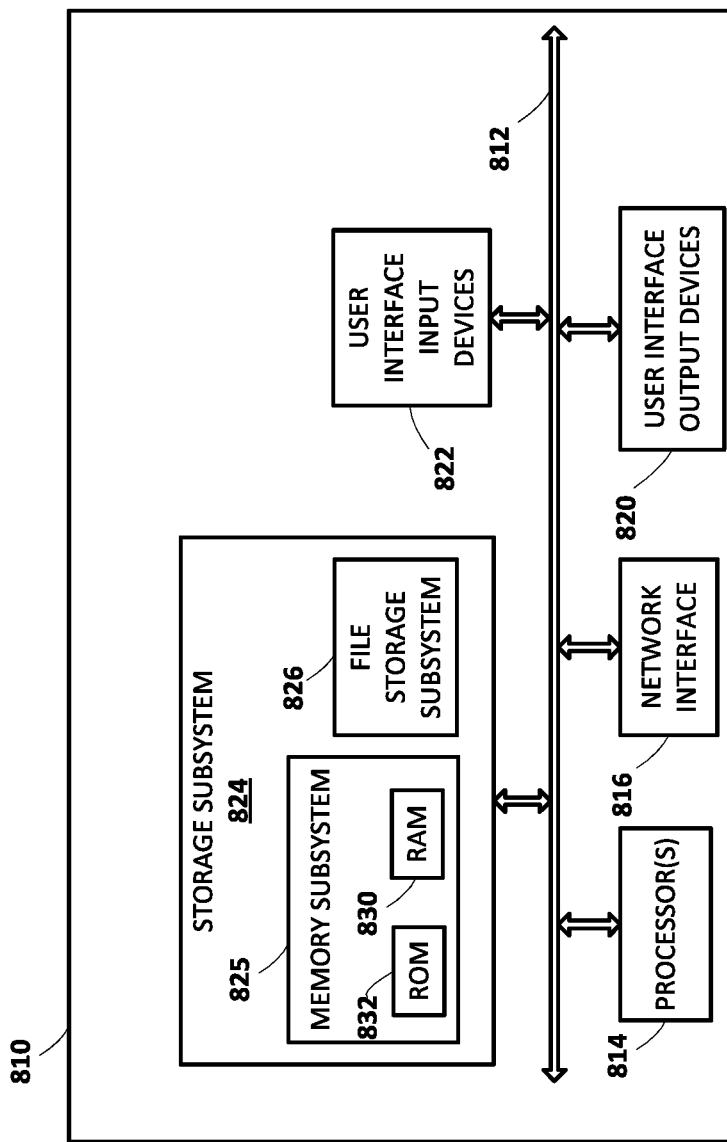
FIG. 8 illustrates an example architecture of a computing device.

FIG. 8 is a block diagram of an example computing device 810 that may optionally be utilized to perform one or more aspects of techniques described herein. In some implementations, one or more of a client computing device, user-controlled resources engine 134, and/or other component(s) may comprise one or more components of the example computing device 810.

Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the method of FIG. 7, as well as to implement various components depicted in FIG. 1.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
    operating an automated assistant at least in part on one or more devices;
    monitoring audio data captured by a microphone for one or more default hot words, wherein detection of one or more of the default hot words triggers transition of the automated assistant from a limited hot word listening state into a speech recognition state;
    detecting, in media content being rendered on one or more of the devices, a question;
    in response to detecting the question in the media content, performing a web search to determine a likely answer to the question;
    based on the answer, activating one or more content-specific hot words that are pertinent to the answer;
    without detecting of one or more of the default hot words or transitioning the automated assistant into the speech recognition state, detecting one or more of the content-specific hot words in an utterance captured by the microphone; and
    in response to detecting one or more of the content-specific hot words in the utterance captured by the microphone, providing natural language output containing feedback about the utterance.

2. The method of claim 1, wherein the media content comprises a video.

3. The method of claim 1, wherein one or more of the content-specific hot words identifies one or more entity types, and the natural language output identifies a value for the entity type.

4. The method of claim 1, wherein the media content comprises a gameshow.

5. An assistant computing device comprising:
    one or more processors;
    a microphone operably coupled with the one or more processors; and
    non-transitory memory operably coupled with the one or more processors, wherein the memory stores instructions that, in response to execution of the instructions by one or more of the processors, cause the one or more processors to operate an automated assistant, wherein the automated assistant is to:
    monitor audio data captured by a microphone for one or more default hot words, wherein detection of one or more of the default hot words triggers transition of the automated assistant from a limited hot word listening state into a speech recognition state;
    detect, in media content being rendered on one or more devices, a question;
    in response to detecting the question in the media content, perform a web search to determine a likely answer to the question;
    based on the answer, activate one or more content-specific hot words that are pertinent to the answer;
    without detecting of one or more of the default hot words or transitioning the automated assistant into the speech recognition state, detect one or more of the content-specific hot words in an utterance captured by the microphone; and in response to detection of one or more of the content-specific hot words in the utterance captured by the microphone, provide natural language output containing feedback about the utterance.

6. The system of claim 5, wherein the media content comprises a video.

7. The system of claim 5, wherein one or more of the content-specific hot words identifies one or more entity types, and the natural language output identifies a value for the entity type.

8. The system of claim 5, wherein the media content comprises a gameshow.

9. The system of claim 8, further comprising instructions to match one or more of the content-specific hot words to a response to a question posed during the gameshow.

10. At least one non-transitory computer-readable medium comprising instructions that, in response to execution by one or more processors, cause the one or more processors to operate an automated assistant, wherein the automated assistant is to:

monitor audio data captured by a microphone for one or more default hot words, wherein detection of one or more of the default hot words triggers transition of the automated assistant from a limited hot word listening state into a speech recognition state;

detect, in media content being rendered on one or more devices, a question;

in response to detecting the question in the media content, perform a web search to determine a likely answer to the question;

based on the answer, activate one or more content-specific hot words that are pertinent to the answer;

without detecting of one or more of the default hot words or transitioning the automated assistant into the speech recognition state, detect one or more of the content-specific hot words in an utterance captured by the microphone; and in response to detection of one or more of the content-specific hot words in the utterance captured by the microphone, provide natural language output containing feedback about the utterance.

11. The non-transitory computer-readable medium of claim 10, wherein the media content comprises a video.

12. The non-transitory computer-readable medium of claim 10, wherein one or more of the content-specific hot words identifies one or more entity types, and the natural language output identifies a value for the entity type.

13. The non-transitory computer-readable medium of claim 10, wherein the media content comprises a gameshow.

* * * * *